Jan. 29, 1952     R. FOSSATI     2,583,937
SURGICAL EXPLORING AND OPERATING DEVICE
Filed Sept. 9, 1947     2 SHEETS—SHEET 1
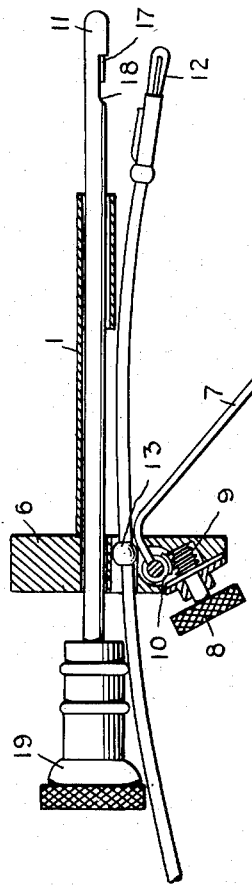
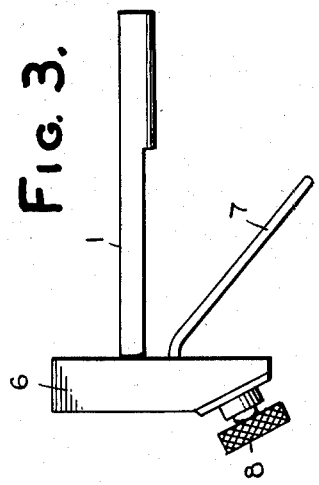
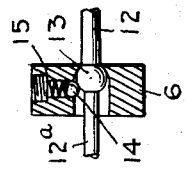
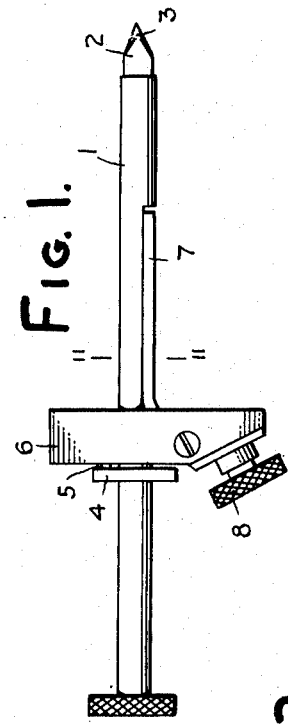
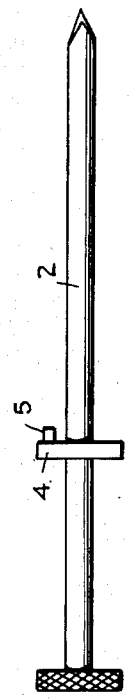
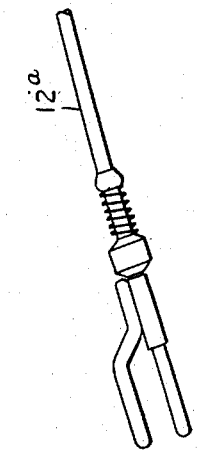
INVENTOR
R. FOSSATI
BY
ATTORNEY

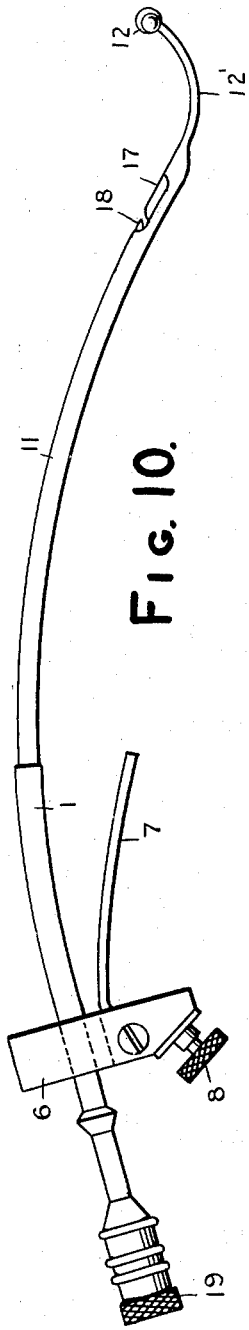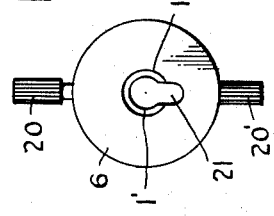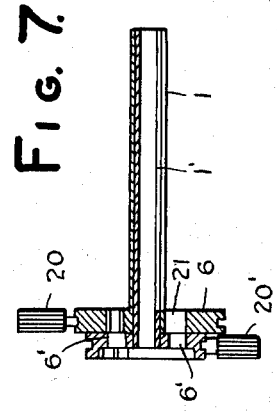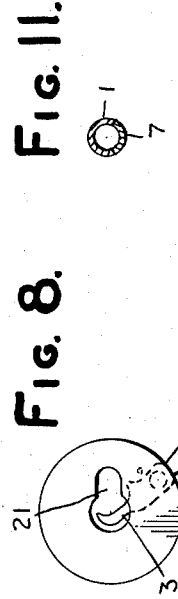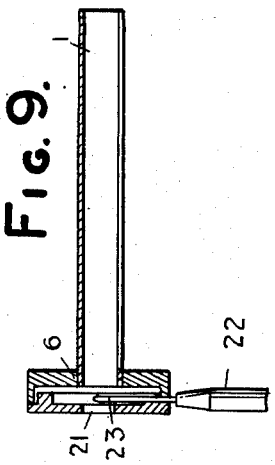

Patented Jan. 29, 1952

2,583,937

UNITED STATES PATENT OFFICE 2,583,937

SURGICAL EXPLORING AND OPERATING DEVICE

Riccardo Fossati, Milan, Italy

Application September 9, 1947, Serial No. 773,045
In Italy May 4, 1946

Section 1, Public Law 690, August 8, 1946
Patent expires May 4, 1966

4 Claims. (Cl. 128—4)

The present invention relates to surgical appliances or instruments, and particularly to those suitable for exploring and operating on persons having internal disorders.

Under the general denomination of "endoscopes," surgical instruments are known which are employed for the examination of the pleuric and abdominal cavities. Such an instrument consists essentially of a rigid tube called a "cannula," in the art, which is introduced into the cavity with the aid of a surgical trocar, this latter piercing the thoracic or abdominal wall to provide an opening for the tube which is inserted incidentally with the trocar. After having pierced the wall, the trocar is separated from the cannula and withdrawn therefrom, thus leaving free the hollow passage through the said cannula by which the anatomic cavity to be examined is accessible from the exterior. The said cannula is then utilised to introduce into the cavity an endoscope or similar optical device, which may be provided with an electric lamp for the illumination of the field which is to undergo examination.

The cannula bore can also be utilised for eventual surgical interventions as, for example, for the cutting of adhesions according to Jacobaeus, by means of the introduction of a thermocautery or, generally, of a surgical instrument. With the more elementary types of apparatus, the introduction of such a surgical instrument through the cannula can be performed only after having removed the telescope or endoscope, in which case, for the purpose of the continued examination, it is necessary to pierce the thoracic or abdominal wall in another point in order to have, within the cavity, both the surgical instrument and the optical device (i. e. the endoscope) simultaneously.

To obviate such an inconvenience, more recent appliances are arranged so as to contain, at the same time, and within the same cannula, both the endoscope and the thermocautery. In order to allow both the said instruments to be simultaneously within the cannula, the latter must have a diameter much larger than the aforementioned simpler types and, consequently, the size of the trocar and the size and importance of the wound to which the patient is necessarily submitted for the introduction of the apparatus, are considerably increased. Moreover, with the appliances heretofore proposed, the axis along which the surgical instrument can be projected is incapable of variation and is parallel to that of the endoscope.

It follows, therefore, that in spite of the arcuate shape which can be given to the shank of said instrument (for example, a thermocautery) with the purpose of increasing, by means of imparting a rotation, the displacement amplitude of the activating tip, and therefore of the operative field of the instrument, the said amplitude is always very narrow and the intervention becomes toilsome and also, not infrequently, highly uncertain as to success. Furthermore, the flexibility which the surgical instrument must sometimes necessarily possess in order to assume, each occasion, the bend which is deemed most suitable to reach the visceral point concerned, is obtained by the employment of materials and constructional features which make the instrument inappropriate for sterilisation in hot water after use. In addition to the foregoing, the illumination device, being necessarily connected to the endoscopic device, it is impossible to perform a transillumination of the viscera under examination.

The object of the present invention is to provide apparatus by which all the disadvantages, referred to above, are entirely obviated. Consequently, by means of the apparatus according to the present invention the following advantages or improvements can be attained:

(a) The possibility to introduce with one and the same cannula both the endoscope and the surgical instrument, the translation movement of the latter being independent of a fixed axis, and therefore having the possibility of movement along variable axes.

(b) Contrarily to what has been previously proposed, the endoscope and the surgical instrument can exchange their relative locations increasing, in such a manner, the amplitude of the operation and observation fields.

(c) As a consequence of what has been stated in the preceding paragraph, and by locating the endoscope in one seating, the operating surgeon is enabled to introduce through the other seating a lighting system allowing the trans-illumination of the viscera. Furthermore, to a rod or shank for supporting the lighting system, a curvature can be imparted in order to more easily reach, with the lamp, the space behind the viscera which is to be trans-illuminated thereby.

(d) The surgical instrument such as, for example, a needle, thermocautery or the like, irrespective of its curved or straight form, can be made rigid, and therefore can be produced from a material suitable for water sterilisation.

(e) As will become apparent from the following description of the apparatus according to this invention, the diameter of the cannula, and hence the size of the wound through which the said cannula is introduced, can be made much smaller than the wounds associated with some of the devices as known hitherto, by virtue of a peculiar constructional feature forming one of the objects of this invention. It is also readily possible in the present invention, to insert an instrument through the cannula and to insert another instrument to coact with same, below the cannula, after the cannula has been inserted in the body of the patient.

(f) Through the aforesaid constructional feature, the body of the cannula, and hence the whole apparatus, can be firmly attached to the wall of the anatomic cavity preventing, in such a manner, any accidental removal of the unit (which might be caused by a contraction, a coughing of the patient or by a mistake of the operator).

(g) The apparatus which is hereinafter described has the possibility, not present in the apparatus previously known, to make use of thermocauteries with variously shaped activating tips, for example hook-shaped.

(h) The apparatus of the present invention, owing to its peculiar form, has the property of permitting the introduction into the cavity which is under attention, various surgical instruments such as pincers, scissors, conchotomies, surgical needles for stitching, utensils for the narcosis, &c.

These and other features of the invention will be apparent from the following description of some forms of embodiment, and with reference to the accompanying drawings in which—

Figure 1 shows a view of a cannula with a surgical trocar, according to the invention, and in the position taken by the unit during the introduction through the thoracic or abdominal wall.

Figure 2 is a view of the surgical trocar alone.

Figure 3 shows the cannula alone, as ready to receive the endoscope and the surgical instrument, after having been introduced into the anatomic cavity to be examined.

Figure 4 shows a partly sectioned view, by way of example of one form of construction of the cannula, during the time of the intervention in which it is necessary to employ, at the same time, the endoscope and a thermocautery; the thermocautery shown in this figure possessing characteristics which may be common to all instruments which are employed in accordance with this invention.

Figure 5 shows a constructional detail of the cannula body with the purpose of more clearly illustrating the operation of the said detail.

Figures 6 and 7 are an end view and sectional elevation, respectively, of a modified form of construction of cannula in accordance with the present invention.

Figures 8 and 9 illustrate, in a similar manner, a further embodiment of the cannula.

Figure 10 shows a curved cannula 1, combined with a curved and rigid transparent shank 11 carrying an instrument (e. g. the thermocautery 12, and carrying a lamp 17, and port 18, and at the other end an eye-piece 19.

Fig. 11 shows a cross section of the form of cannula shown in Fig. 1, with the aperture closed. This section is taken on line 11—11 of Fig. 1.

Referring to Figures 1 to 5 inclusive and 11, the cannula tube 1 as previously mentioned, is introduced together with the surgical trocar 2 through the wall which is to be pierced and, during this period of the operation, the whole cannula and trocar form a unit, shown by Fig. 1. After the cannula has been introduced in such a manner, the trocar is withdrawn. The said trocar is shown alone in Fig. 2 which clearly illustrates the characteristics of the trocar, i. e. the sharp cutting point 3, the flange 4 rigidly attached to the shank of the trocar, acting as a stop against the base 6 of the cannula when the introduction pressure is exerted on the cannula, and the pin 5 by which the trocar is firmly engaged by the cannula and, also, in regard to any rotation so that the introduction, and the simultaneous angular displacement of the trocar, can be performed by seizing the cannula at the base 6.

The base 6 limits the distance of introduction of the cannula by resting against the thoracic or abdominal wall, and within it are fitted all appliances by which the surgical and endoscopic operations are to be performed. For such a purpose, on the cannula wall the shutter flap 7 is provided, which can be opened by turning the button 8 which operates about the hinge of the said shutter flap 7, in the manner clearly shown by Figure 4 through the worm and screw gearing 9 and 10. When the shutter flap is in the position shown in Fig. 1, it closes the slit in the bottom of the cannula 1. When it is in the position shown in Figs. 3 and 4, it holds the base 6 firmly against the patient. When the flap 7 is moved into the position shown in Figs. 3 and 4, it necessarily stretches downwardly the opening made by introducing the trocar 2 and cannula 1, thereby affording room for introducing another instrument such as the thermocautery 12 mounted at the end of the shank 12a, as shown in Fig. 4.

In Fig. 4, 16 shows a cylindrical piece 16, attached to the shank 12a of the thermocautery 12, and spaced ahead of this is on shank 12a a loosely mounted collar 16a, separated from the collar 16, by spring 16b, so that in pushing the thermocautery 12 as far as it will go, the surgeon feels the spring 16b being compressed, and he then knows that he has pushed this nearly as far as it should go.

Through the cannula 1 can be introduced, for example, an endoscope 11 with the lamp 17 having the port 18, for the interior examination of the cavity tissues etc. by means of the eye-piece 19 whilst, through the slot which is left free after the opening of the shutter flap 7, adjacent to the cannula a surgical instrument of the necessary character can be introduced, for example, the thermocautery 12, provided with a spherical sliding sleeve 13 which can be maintained in its engagement of the head 6 by means, for example, of a locking device consisting of a small ball 14 urged toward the shank 12a of instrument 12, by a spring 15, as shown in Figure 5.

However, the head 6 may be provided with only a single oval shaped hole for the contemporaneous introduction of the instruments 11 and 12; and the device according to the present invention, obviously, can take many other different forms.

One of these forms is shown in Figures 6 and 7, in which the cannula is composed by two concentrically arranged tubes 1 and 1', over the whole length of which a slot is formed and which are secured respectively to the two parts 6 and 6' of the head, rotatably arranged the one in respect of the other, and which can be rotated by means respectively of the two handles 20 and 20' so as to bring into register or coincidence the aforesaid slots and forming, in such a manner, an opening through one side of the cannula, for the introduction of a second instrument (the first being constituted by the endoscope) through the suitably shaped hole 21 formed in the head.

Another form of the cannula is shown by Figures 8 and 9. In this case, the cannula is composed simply by a tubular piece 1 secured to the head 6, over the whole length of which tubular piece a slot has been formed.

In this case, the hole in the head 6 (see Fig. 4) can be partially obstructed by the small lever 23, operated through the medium of the handle 22, so as to divide the said hole into two parts and by which two instruments can be more rationally supported.

With the cannula according to the present invention instruments which are either curved or straight can be employed to allowing working within an ample anatomical field as, for example, the apparatus shown in Figure 10 provided with a curved system of lenses which allows the vision, through the port 18 and the eye-piece 19, of the thermocautery 12 by means of the lamp 17, this being a remarkable improvement on the prior practice according to which it has been necessary to make curved instruments from a flexible material and, therefore, it has been impossible to fit a system of lenses into such instruments and to sterilise them by means of an autoclave, as can readily be done with the instrument of Fig. 10. Here also the cannula 1 (curved) can have the movable shutter flap 7, operated by the hand screw 8, as in Figs. 1, 3 and 4, but the shutter flap here is curved similarly to the cannula 1 in this figure.

In the modification shown in Fig. 10, the cannula 1 may be curved, as shown. The flap 7 is similarly curved, and also the endoscope 11. After the cannula has been introduced into the body of the patient by the use of a trocar, and the flap 7 has been opened the whole length of 1, the forward end of the endoscope carrying an instrument such as the thermocautery 12, can be introduced in an inverted condition through the cannula, and the open slit in its bottom, the curved shank 12' being of much smaller diameter than the endoscope 11, until the part 17 reaches approximately the forward end of the cannula 1, when the endoscope and its attachments can be rotated 180°, i. e. turned upside down, and the endoscope pushed forward to the position shown in Fig. 10. The endoscope here is of smaller diameter than the interior of the cannula 1, which allows such rotation operation.

I have above referred to the flap 7 as being at the bottom of the cannula 1. This is as shown in Figs. 1, 3, 4, 10 and 11 of the drawing. But it will be understood that the surgeon will turn the cannula to get the said flap at the proper angle to the cannula, to meet the needs of the particular case.

I declare that what I claim is:

1. An appliance for surgical purposes consisting of a base provided with a cannula with open ends for introduction through the thoracic or abdominal cavity by means of a trocar to be subsequently withdrawn, said cannula being provided with a longitudinal slot extending through at least a considerable portion of its length, said base being provided with an elongated aperture which includes the continuation of the bore of said cannula, the portion of said perforation exceeding the continuation of said bore being located on that side of the cannula where the same is slotted, whereby a surgical instrument can be introduced through the cannula and then moved longitudinally in said aperture and moved laterally from the cannula through said slot, leaving the cannula free for the introduction of a second surgical instrument.

2. An appliance for surgical purposes, consisting of a base provided with a cannula with open ends for introduction through the thoracic or abdominal cavity by means of a trocar to be subsequently withdrawn, a tubular body rotatably mounted within said cannula coaxial with the same and provided with means for rotating it by hand within said cannula, each of said cannula and said tubular body being provided with a longitudinal slot extending through at least a considerable portion of its length, said base being provided with an elongated aperture which includes the continuation of the bore of said cannula, the portion of said perforation exceeding the continuation of said bore being located on that side of the cannula where the same is slotted, whereby a surgical instrument can be introduced through the cannula and then moved longitudinally through said aperture and moved laterally from the cannula through said slot, leaving the cannula free for the introduction of a second surgical instrument.

3. An appliance for surgical purposes, consisting of a base provided with a cannula of a diameter sufficient to contain a trocar or perforator by which the cannula can be introduced through the thoracic or abdominal wall of the patient to be subsequently withdrawn leaving said cannula inserted, said cannula being provided with a longitudinal slit like aperture in its cylindrical wall for the passage therethrough of a surgical instrument, and a shutter for closing said aperture, and operating means for opening and closing said shutter, mounted upon said base, said operating means comprising a hand piece capable of displacing said shutter angularly from said cannula to open said aperture when said cannula has been introduced into a cavity in the body of the patient, and said means being capable of moving said shutter to close said aperture.

4. An appliance for surgical purpose consisting of a base provided with a cannula of a diameter sufficient to contain a trocar by which a perforation can be made through which said cannula can be introduced through the thoracic or abdominal wall and allowing said trocar to be removed, said cannula being provided with an elongated slit like aperture extending lengthwise for a part of the length of the cylindrical wall of said cannula for the passage therethrough of a surgical instrument, and a shutter flap constituting a closure for said aperture, said flap being hinged on a pivot positioned on said base and provided with an actuating member operable by hand to tilt said closure flap on said pivot, to leave said aperture open in one position and closed in another position.

RICCARDO FOSSATI.

REFERENCES CITED

The following references are of record in the file of this patent:

UNITED STATES PATENTS

| Number | Name | Date |
|---|---|---|
| 295,798 | Pagett | Mar. 25, 1884 |
| 302,846 | Ingersoll | July 29, 1884 |
| 1,585,934 | Muir | May 25, 1926 |
| 1,705,513 | Wappler | Mar. 19, 1929 |
| 2,382,109 | Sheiffele | Aug. 14, 1945 |

FOREIGN PATENTS

| Number | Country | Date |
|---|---|---|
| 429,272 | Italy | Jan. 21, 1948 |

OTHER REFERENCES

Article, "The Cutler Operating Forceps Thoracoscope," published by American Cystoscope Makers, 450 Whitlock Avenue, New York, New York, pages 3, 4 and 5.